UNITED STATES PATENT OFFICE.

HOWARD F. CHAPPELL, OF NEW YORK, AND GUSTAV EMANUEL COHEN, OF BROOKLYN, NEW YORK; SAID COHEN ASSIGNOR TO SAID CHAPPELL.

PURIFYING ALUMINA.

1,079,900. Specification of Letters Patent. Patented Nov. 25, 1913.

No Drawing. Application filed July 17, 1913. Serial No. 779,517.

*To all whom it may concern:*

Be it known that we, HOWARD F. CHAPPELL, residing in the borough of Manhattan, city, county, and State of New York, and GUSTAV EMANUEL COHEN, residing at No. 473 Pacific street, Brooklyn, county of Kings, State of New York, both citizens of the United States, have invented certain new and useful Improvements in Purifying Alumina; and we do hereby declare the following to be a full, clear, and exact description of the invention, such as will enable others skilled in the art to which it appertains to make and use the same.

The present invention relates to a cheap and efficient method of producing pure alumina from natural minerals or artificial compounds containing silica and alumina. The invention is applicable, for instance, to the treatment of impure alumina obtained by calcining alunite until the alumina contained in it is insoluble in water and then washing out the alkali metal salts present in the calcined product. The alumina thus obtained contains silica which it is desirable to remove in order to permit the alumina to be employed to advantage in the production of aluminum. For the removal of the silica from alumina obtained from alunite or from other alumina containing silica I may proceed in accordance with the present invention in various ways. Thus, the silica-containing alumina is first subjected to a sufficiently high temperature until the alumina becomes practically insoluble in hydrofluoric acid, the solubility of the silica remaining practically unaffected; then, the alumina may be mixed with a solution in water of a fluorid of ammonium (preferably ammonium bi-fluorid) in excess of the amount required to combine with all the silica contained in the alumina. This mixture should preferably be stirred repeatedly and may then be allowed to stand at ordinary atmospheric temperatures for about twelve hours and until the reaction is complete. The strength of the ammonium bi-fluorid solution employed for the treatment of alumina obtained from calcined alunite, may vary, but it is found there is no great advantage in using solutions of high percentage, except in shortening somewhat the time required for the operation. Thus, when a 25% solution is employed for the treatment of alumina containing approximately 6% silica, the silica content is reduced to as low as from .01 to .10%; that is, substantially all the silica is removed. The amount of alumina made soluble by this treatment is practically unimportant, not exceeding say 10% of the alumina treated. In order to separate the silica from the mass, at the termination of the treatment with the solution of ammonium bi-fluorid, the solution may be filtered and the residue washed so as to free it, as far as possible, from ammonium bi-fluorid and aluminum fluorid. In some instances it has been found more economical not to attempt to remove all the silica in one operation but to subject the more highly purified alumina to a less contaminated solution of bi-fluorid by a series of progressive steps as would be the case in the ordinary practice of lixiviation. The residue is preferably heated in a closed vessel at a temperature somewhat higher than 100 deg. C. until there is no further evolution of ammonium bi-fluorid and the vapors containing ammonium bi-fluorid are conducted into a suitable vessel for the recovery of the same. The residue may then be calcined to drive off any traces of fluorids that may still adhere to it. Into the solution which has been filtered from the alumina (which contains ammonium bi-fluorid, silica and a small amount of alumina in solution as fluorid,) ammonia, either in the form of ammonia gas or aqua-ammonia, is conducted until no further precipitate is formed and until the solution gives a strong alkaline reaction. The solution may then be filtered and the residue, which had been dissolved and which is now precipitated, and which consists of alumina and silica is washed and heated at a temperature of approximately 100 deg. C. to free it from fluorid of ammonium. The heating should take place in a closed vessel arranged so as to recover the escaping vapors of ammonia and fluorids of ammonium. The filtrate containing ammonium fluorid is then heated at a temperature sufficient to convert the ammonium fluorid into ammonium bi-fluorid. A temperature between 35 and 50° C. should be used, and the solution should be heated until practically all the ammonium fluorid has been converted into ammonium bi-fluorid. This operation may be conducted in a closed vessel and the evolved gases recovered by conducting them into water or into the above-described solution of ammonium bi-fluorid which contains the silica and alumina.

It may be seen from the foregoing that the process may be conducted in a continuous cycle, which is preferable. Theoretically, there should be no loss of ammonia or ammonium bi-fluorid. Practically, however, some of these re-agents are lost.

The temperature to which alumina should be raised in order to render it practically insoluble in ammonium bi-fluorid, in accordance with the present invention, should preferably be as high as 1000° C. and it may to advantage be carried to a still higher degree, say 1500° C.

What we claim is:

1. The method of removing silica from alumina containing the same, which comprises heating it to a temperature sufficiently elevated to render the alumina substantially insoluble in ammonium fluorids, then removing silica therefrom by subjecting it to the dissolving action of a fluorid of ammonium, and removing the solution containing the silica from the purified alumina; substantially as described.

2. The method of removing silica from alumina containing the same, which comprises heating it to a temperature sufficiently elevated to render the alumina substantially insoluble in ammonium bi-fluorid, then removing silica therefrom by subjecting it to the dissolving action of ammonium bi-fluorid, and removing the solution containing the silica from the purified alumina; substantially as described.

In testimony whereof we affix our signatures, in presence of two witnesses.

HOWARD F. CHAPPELL,
GUSTAV EMANUEL COHEN.

Witnesses:
M. A. BILL,
M. L. BOWEN

Copies of this patent may be obtained for five cents each, by addressing the "Commissioner of Patents, Washington, D. C."